(12) United States Patent
Bender et al.

(10) Patent No.: US 12,731,074 B2
(45) Date of Patent: Sep. 8, 2026

(54) SYSTEM AND METHOD FOR A PERSISTENT AND PERSONALIZED DATASET SOLUTION FOR IMPROVING GUEST INTERACTION WITH AN INTERACTIVE AREA

(71) Applicant: Universal City Studios LLC, Universal City, CA (US)

(72) Inventors: Josiah Logan Bender, Winter Park, FL (US); Angelo Pagliuca, Orlando, FL (US); Anthony Melo, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 902 days.

(21) Appl. No.: 18/095,273

(22) Filed: Jan. 10, 2023

(65) Prior Publication Data

US 2024/0232697 A1 Jul. 11, 2024

(51) Int. Cl.
*G06N 20/00* (2019.01)

(52) U.S. Cl.
CPC .................................... *G06N 20/00* (2019.01)

(58) Field of Classification Search
CPC ....... G06N 20/00; A63F 13/424; A63F 13/67; A63F 13/428; A63G 31/00; G06F 3/017; G06F 3/167
See application file for complete search history.

(56) References Cited

U.S. PATENT DOCUMENTS 11,532,172 B2 * 12/2022 Skuin .................... A63F 13/422
2011/0007079 A1 1/2011 Perez et al.
2014/0365334 A1 * 12/2014 Hurewitz ........... G06Q 30/0613 705/26.41

(Continued)

FOREIGN PATENT DOCUMENTS

CN 115437498 A 12/2022
KR 20200081529 A 7/2020
WO 2022147526 A1 7/2022

OTHER PUBLICATIONS

Randerson, "How Disney World Uses Big Data," 11 pgs. https://randerson112358.medium.com/how-disney-world-uses-big-data-24de9c1175a5.

(Continued)

*Primary Examiner* — Ryan Barrett
(74) *Attorney, Agent, or Firm* — Fletcher Yoder, P.C.

(57) ABSTRACT

A system for facilitating user interaction with interactive areas includes a memory encoding processor-executable routines. The system also includes a processor configured to access the memory and to execute the processor-executable routines. The processor may identify data a user of an interactive area based on identifying data obtained at the interactive area. The processor may also utilize a trained machine learning model personalized for the user, wherein the trained machine learning model personalized for the user is configured to recognize idiosyncrasies of the user. The processor may also utilize the trained machine learning model personalized for the user in detecting an idiosyncratic task performed by the user interacting with the interactive area to activate a special effect associated with the interactive area based on interactive data obtained at the interactive area. The processor may further instruct the initiation of the special effect in response to detecting the idiosyncratic task.

20 Claims, 3 Drawing Sheets

(56) References Cited

U.S. PATENT DOCUMENTS

| | | | | |
|---|---|---|---|---|
| 2014/0372896 | A1* | 12/2014 | Raman .................... | G06F 3/017 715/741 |
| 2017/0177073 | A1* | 6/2017 | Mason .................... | G06F 3/017 |
| 2019/0324553 | A1 | 10/2019 | Liu et al. | |
| 2020/0276510 | A1 | 9/2020 | Weston | |
| 2021/0174589 | A1 | 6/2021 | Emery et al. | |
| 2023/0128658 | A1* | 4/2023 | Young ................. | G06F 3/04883 463/36 |
| 2024/0012471 | A1 | 1/2024 | Lugo et al. | |

OTHER PUBLICATIONS

Arize, “Model Monitoring,” 2023, 19 pgs. https://arize.com/model-monitoring/?utm_source=google&utm_medium=cpc&utm_campaign=18259781406&utm_content=140909930156&utm_term=model%20monitoring%20machine%20learning&utm_term=model%20monitoring%20machine%20learning&utm_campaign=Search+Only+Monitoring.

Yu et al., “A Theme Park Tourist Service System with a Personalized Recommendation Strategy,” Applied Sciences, 2018, MDPI Publications, 21 pgs.

PCT/US2024/010900 International Search Report and Written Opinion mailed May 10, 2024.

* cited by examiner

60

IDENTIFY USER 62

ACCESS GENERAL ML MODEL 64

MONITOR FOR TASK 66

UTILIZE GENERAL MODEL TO DETECT TASK 68

INITIATE SPECIAL EFFECT 70

TRAIN GENERAL ML MODEL TO GENERATE PERSONALIZED ML MODEL 72

SYSTEM AND METHOD FOR A PERSISTENT AND PERSONALIZED DATASET SOLUTION FOR IMPROVING GUEST INTERACTION WITH AN INTERACTIVE AREA

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues contain, among many other attractions, interactive areas where guests perform an activity or task (e.g., provide a voice command, make a gesture, etc.) that elicits various special effects in response to performing the activity or task. It is now recognized that sometimes the guests experience difficulties in properly executing the activity or task to elicit the special effects. As a result, the guest may become frustrated with the interactive area. One of the reasons this problem arises is due to machine learning models (which have been trained on a data aggregate composed from a large variety of people) fail to take into account idiosyncrasies of individuals. For example, machine learning models are generally trained by feeding a large body of examples, where each example is somehow different in some way not pertinent to the feature the model is being trained for. For example, in order to train a model to detect a pushup pose, photos of different people in that pose are provided. By changing the person in the photo, the model can be trained to see different body types, skin tones, and heights, yet still not recognize the pushup pose. Thus, when you begin to run the model, if there is not a sufficiently large set of training photos, the model may have some difficulty recognizing when a pose has occurred. In addition, once a machine learning model is trained, it provides no room for adjustment or improvement and it does not allow for guest difference and intuition. Instead, it is hoped that the majority of the guests fill the mode or fall within the trained machine learning model. Even if the trained machine learning model is updated, it is updated for every guest in general, not a specific person. Accordingly, it may be desirable to improve upon machine learning dataset solutions to better take into account the idiosyncrasies of individual guests to enhance their experience when performing a task or activity.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a system for facilitating user interaction with interactive areas includes a memory encoding processor-executable routines. The system also includes a processor configured to access the memory and to execute the processor-executable routines, wherein the routines, when executed by the processor, cause the processor to perform acts. The acts include identifying a user of an interactive area based on identifying data obtained at the user interface. The acts further include utilizing a trained machine learning model in detecting an idiosyncratic task performed by the user interacting with the interactive area to activate a special effect associated with the interactive area based on interactive data obtained at the interactive area, wherein the trained machine learning model is configured to recognize idiosyncrasies of the user. The acts even further include instructing initiation of the special effect in response to detecting the idiosyncratic task.

In an embodiment, a computer-implemented method for facilitating user interaction with interactive areas includes identifying a user of an interactive area based on identifying data obtained at the interactive area. The acts also include obtaining a trained machine learning model personalized for the user, wherein the trained machine learning model is configured to recognize idiosyncrasies of the user. The acts further include utilizing the trained machine learning model in detecting an idiosyncratic task performed by the user interacting with the interactive area to activate a special effect associated with the interactive area based on interactive data obtained at the interactive area. The acts even further include initiating the special effect in response to detecting the idiosyncratic task.

In an embodiment, a non-transitory computer-readable medium includes processor-executable code that when executed by a processor, causes the processor to perform acts. The acts include identifying a user of an interactive area based on identifying data obtained at the interactive area. The acts also include utilizing a trained machine learning model personalized for the user in detecting an idiosyncratic task performed by the user interacting with the interactive area to activate a special effect associated with the interactive area based on interactive data obtained at the interactive area, wherein the trained machine learning model personalized for the user is configured to recognize idiosyncrasies of the user. The acts even further include instructing initiation of the special effect in response to detecting the idiosyncratic task.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figures 1, 2, 3:
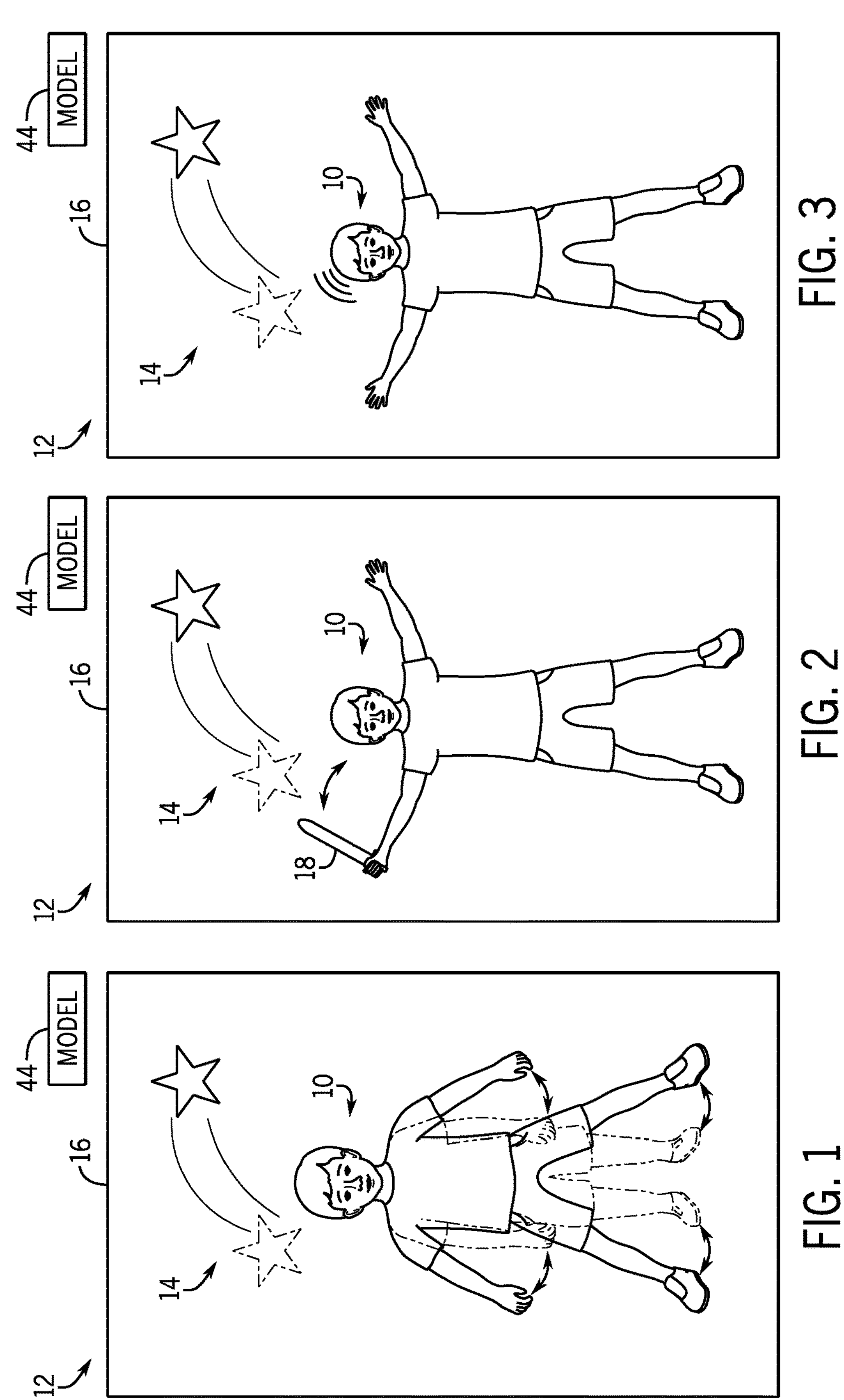
FIG. 1 is a schematic diagram of a user interacting with an interactive area (e.g., via body movement), in accordance with aspects of the present disclosure.
FIG. 2 is a schematic diagram of a user interacting with an interactive area (e.g., via manipulation of a device), in accordance with aspects of the present disclosure.
FIG. 3 is a schematic diagram of a user interacting with an interactive area (e.g. via voice command), in accordance with aspects of the present disclosure.

The present disclosure relates generally to systems and methods for a persistent and personalized machine learning dataset solution for improving guest interaction with an interactive area (e.g., by taking into account individual idiosyncrasies of the guests).

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

Embodiments of the present disclosure are directed to systems and methods for a persistent and personalized machine learning dataset solution for improving guest interaction with an interactive area. In particular, the disclosed embodiments utilize a personalized machine learning model trained to recognize idiosyncrasies of a user (e.g., guest) when they perform a task or activity (e.g., voice command, movement with their body, or movement of a manipulated device) to activate or initiate a particular special effect at an interactive area. The personalized machine learning model takes into account the idiosyncrasies of the user when they perform the task (e.g., idiosyncratic task) in a manner in which they believe the task should be performed.

Each time the user performs an idiosyncratic task at an interactive area, the performance of the task serves as data point for training, retraining, or updating the personalized machine learning model. The personalized machine learning model may be updated after acquiring each data point or after a certain number of data points are acquired. In either case, the personalized machine learning model is constantly being trained or updated. The data points may consist of the same and/or different idiosyncratic tasks performed at the same and/or different interactive areas. The initial training of the personalized machine learning model includes, when a guest is first identified at an interactive area, obtaining a general machine learning model. The general machine learning model is configured to fit most data collected. The general machine learning model is generated utilizing predetermined data collected from tasks performed by a number of different users at different interactive areas. Once the general machine learning model is obtained, the data point acquired from the user (i.e., performance of the idiosyncratic task believed by the user to initiate or active the special effect associated with an interactive area). Once a certain number of data points are collected and utilized in training, a trained machine learning model personalized to the user is generated. Besides being personal to the user, the trained machine learning model is persistent in that it can be utilized for subsequent activities (e.g., the performance of different idiosyncratic tasks performed at different interactive areas). The disclosed embodiments enable the activation of the experience or what the user (e.g., guest) themselves believe is the activation to actually be what activates the experience.

FIGS. 1-3 are schematic diagrams of a user 10 (e.g., guest) interacting with an interactive area 12. The interactive area 12 may be an attraction at an amusement park or theme park. The user 10 may interact with the interactive area 12 by performing a task or activity to initiate or activate a special effect 14. The special effect 14 may be any type of special effect (appearance of an object into view (e.g., via screen or projection), lighting effect, smoke, sound, movement of an animated figure or other object, etc.). As depicted in FIGS. 1-3, the special effect 14 is movement of animation across a screen or display 16.

The task or activity to be performed by the user 10 to initiate or activate the special effect 14 can take a variety of forms. For example, in FIG. 1, the user 10 moves one or more portions of their body to initiate or activate the special effect 14. In FIG. 2, the user 10 moves a device or object 18 (e.g., in a certain pattern) to initiate or activate the special effect 14. In FIG. 3, the user 10 speaks a voice command to initiate or activate the special effect 14. Each user 10 may have their own idiosyncrasies in performing a task or activity in a manner in which they believe will initiate or activate the special effect 14. As described in greater detail below, a respective personalized and persistent machine learning model (e.g., model 44) may be generated for each user 10 that is trained to recognize the idiosyncrasies of a respective user 10. The personalized machine learning model 44 may be utilized in detecting a task (e.g., an idiosyncratic task) performed by the user 10 (with their personal idiosyncrasies) interacting with the interactive area 12 to activate the special effect 14 associated with the interactive area 12. Utilization of the personalized machine learning model 44 helps the user 10 interact with the interactive area 12 by taking the user's idiosyncrasies into account when attempting to initiate or to activate the special effect 14 so that what the user 10 believes is the task or activity to activate the special effect 14 is the actual take or activity to activate the special effect 14.

The personalized machine learning model 44 for the user 10 may be utilized for different idiosyncratic tasks (e.g., of the same category such as voice command, body motion, or movement of a manipulated device 18) performed by the user 10 at different interactive areas 12. In certain embodiments, a different personalized machine learning model 44 may be generated for a single user 10 for different categories of idiosyncratic tasks. For example, a first personalized machine learning model 44 may be utilized for voice command idiosyncratic tasks, a second different personalized machine learning model 44 may be utilized for body motion idiosyncratic tasks, and/or a third different personalized machine learning model 44 for idiosyncratic tasks related to movement of the device 18 may be generated for the same user 10.

The interactive area 12 may include a device (e.g., task detecting device 30 in FIG. 4) to track or monitor the task or activity to be performed by the user 10. For example, a voice recognition system may be utilized to monitor voice commands spoken by the user 10. As another example, a motion tracking system may be utilized to monitor body motion of the user 10. As a further example, an infrared tracking system may be utilized to track movement of the device 18 (e.g., infrared emitting device) being manipulated by the user 10. Other types of devices may be utilized to track or monitor the task or activity performed by the user 10.

The interactive area 12 may also include different types of devices to identify the user 10. In certain embodiments, a facial recognition device (e.g., utilizing one or more cameras) may be utilized to identify the user 10. In certain embodiments, a voice recognition device may be utilized to identify the user 10. In certain embodiments, a radio frequency identification (RFID) reader may be utilized to communicate with the device (e.g., having an RFID chip) worn or held by the user 10 (e.g., band, necklace, badge, etc.). Other types of devices may be utilized to identify the user 10. Identification of the user 10 facilitates generating, obtaining, and utilizing the personalized machine learning model 44 for the user 10 at the different interactive areas 12.

Figure 4:
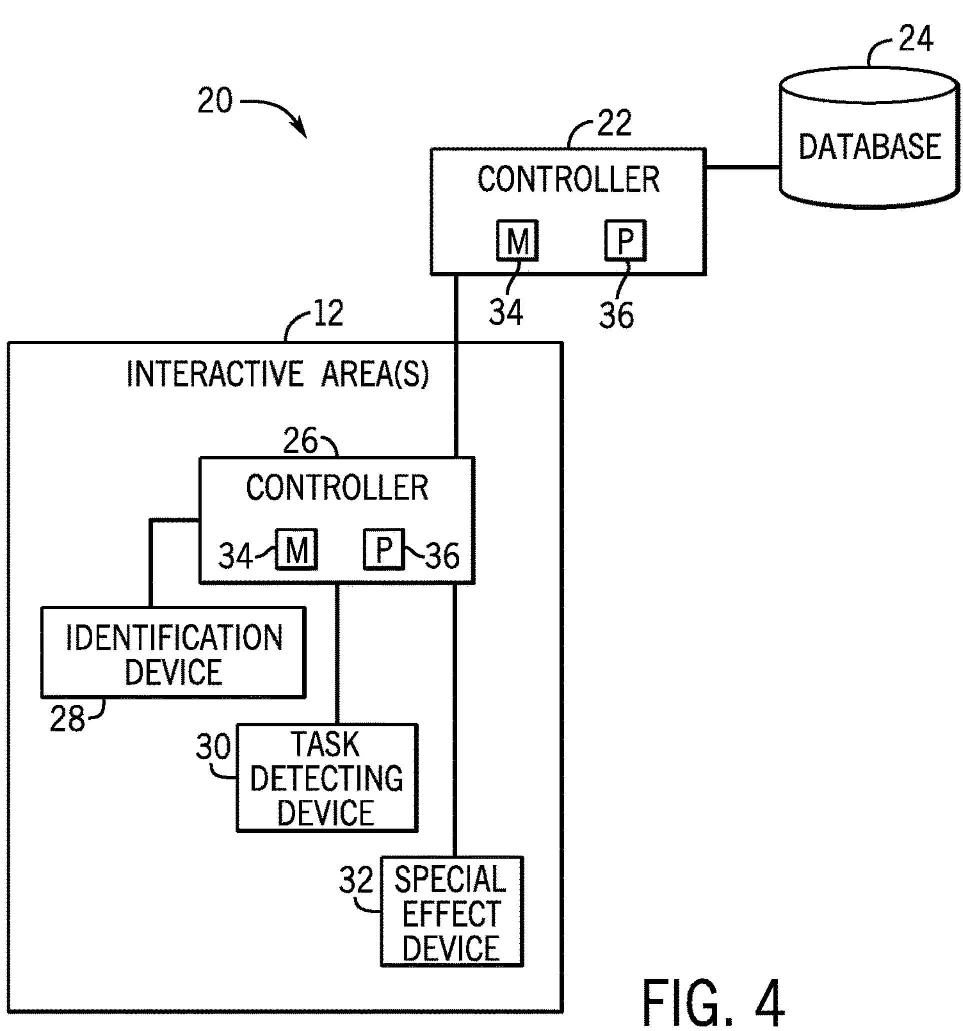
FIG. 4 is a schematic diagram of a system for facilitating user interaction with interactive areas, in accordance with aspects of the present disclosure.

FIG. 4 is a schematic diagram of a system 20 for facilitating user interaction with interactive areas 12. The system 20 includes a controller 22. The controller 22 may be a central or main controller 22. In certain embodiments, the controller 22 may be remote from any of the interactive areas 12. The controller 22 is in communication with a database 24 (e.g., a physical storage and/or a cloud-based storage) via any suitable communication network or networks including a mobile communication network, a Wi-Fi network, local area network (LAN), wide area network (WAN), and/or the Internet.

The database 24 may store different machine learning models of a machine learning module or engine. The machine learning module may include machine learning models associated with and personalized for each guest (e.g., user of an interactive area 12). The personalized machine learning models are configured to recognize idiosyncrasies of a user (from when they interact with interactive areas 12). The personalized machine learning models may be utilized in detecting a task (e.g., an idiosyncratic task) performed by the user (with their personal idiosyncrasies) interacting with the interactive area 12 to activate the special effect 14 associated with the interactive area 12. Utilization of the personalized machine learning model helps the user interact with the interactive area 12 by taking the user's idiosyncrasies into account when attempting to initiate or to activate the special effect so that what the user 10 believes is the task or activity to activate the special effect is the actual take or activity to activate the special effect.

The database 24 also stores one or more general machine learning models. The one or more general machine learning models are configured to recognize tasks performed by users in general to activate respective special effects at different interactive areas 12. The general machine learning models are trained based on acquired data points (i.e., interactions of the same user with interactive areas 12) to recognize the idiosyncrasies of the user (e.g., when interacting with the interactive areas 12). The database 24 further stores guest identification information that can be linked with the machine learning models. In an embodiment, the database 24 even further stores guest calibration data. The guest calibration data may be obtained from specific guests performing a series of tasks that are utilized in conjunction with the general machine learning models in generating personalized machine learning models to recognize idiosyncrasies in the specific guests.

The controller 22 is in communication with respective controllers 26 of different interactive areas 12 (e.g., via a wired or wireless connection) via any suitable communication network or networks including a mobile communication network, a Wi-Fi network, local area network (LAN), wide area network (WAN), Bluetooth®, and/or the Internet. In certain embodiments, each controller 26 may directly communicate with the database 24. Each controller 26 may be coupled to an identification device 28 at each interactive area 12 to identify the user of the interactive area 12. The identification devices 28 utilized at the respective interactive areas 12 may be the same or vary. In certain embodiments, the identification device 28 may include a facial recognition device (e.g., utilizing one or more cameras) utilized to identify the user. In certain embodiments, the identification device 28 may include a voice recognition device utilized to identify the user. In certain embodiments, the identification device 28 includes a RFID reader utilized to communicate with a device (e.g., having an RFID chip) worn or held by the user 10 (e.g., band, necklace, badge, etc.). Other types of identification devices 28 may be utilized to identify the user. Identification of the user facilitates generating, obtaining, and utilizing the personalized machine learning model for the user at the different interactive areas 12.

Each controller 26 may be coupled to a task detecting device 30 at each interactive area 12 to track or monitor the task or activity to be performed by the user. For example, the task detecting device 30 includes a voice recognition system utilized to monitor voice commands spoken by the user. As another example, the task detecting device 30 includes a motion tracking system utilized to monitor body motion of the user. As a further example, the task detecting device 30 includes an infrared tracking system utilized to track movement of a device (e.g., infrared emitting device) being manipulated by the user. Other types of devices may be utilized to track or monitor the task or activity performed by the user. The acquired or detected task or activity performed by the user is utilized as a data point in training, retraining, and updating the personalized machine learning models.

Each controller 26 may further be coupled to special effect device 32 at each interactive area 12. The special effect device 32 is configure cause a special effect in response to a control signal from the controller 26 (in response to an idiosyncratic task performed by the user to initiate or activate the special effect). The special effect may be any type of special effect (appearance of an object into view (e.g., via screen or projection), lighting effect, smoke, sound, movement of an animated figure or other object, etc.).

Each controller 22, 26 includes a memory 34 with stored instructions for facilitating user interaction with interactive areas 12 by controlling components in the interactive areas 12 (e.g., identification device 28, task detecting device 30, special effect device 32, etc.). In certain embodiments, the controller 26 at each interactive area 12 may work independently of controller 22. In certain embodiments, the controller 26 at each interactive area 12 and the controller 22 may work together. In addition, each controller 22, 26 includes a processor 36 configured to execute such instructions. For example, the processor 36 may include one or more application specific integrated circuits (ASICs), one or more field programmable gate arrays (FPGAs), one or more general purpose processors, or any combination thereof. Additionally, the memory 34 may include volatile memory, such as random access memory (RAM), and/or non-volatile memory, such as read-only memory (ROM), optical drives, hard disc drives, or solid-state drives. The memory 34 may store similar information to the information (e.g., user identification, machine learning models, etc.) in the database 24.

The controllers 22, 26 (via the processors 36) are configured to identify users of the interactive area 12 (e.g., based on identifying data obtained by the identification device 28). The controllers 22, 26 (via the processors 36) are configured to obtain a general machine learning model (e.g., configured to recognize tasks performed by users in general to activate respective special effects at different interactive areas 12). The controllers 22, 26 (via the processors 36) are also configured to train these general machine learning models based on one or more idiosyncratic tasks performed by the users at one or more interactive areas 12 to recognize the idiosyncrasies of the users to generate the trained machine learning models personalized for the user. When a user already has a personalized machine learning model, the controllers 22, 26 (via the processors) are configured to obtain or access the trained machine learning model personalized for the user. Subsequent to identifying the user at the interactive area 12, the controllers 22, 26 (via the processors 36) are further configured to monitor for a task or activity (e.g., idiosyncratic task) to be performed by the user to instruct initiation and/or activation of the special effect at the interactive area 12. The controllers 22, 26 are configured to utilize a machine learning module or engine (in particular, a trained machine learning model personalized for the user to recognize the idiosyncrasies of the user) in detecting an idiosyncratic task or activity performed by the user interacting with the interactive area 12 to activate or initiate a special effect associated with the interactive area (e.g., based on interactive data obtained by the task detecting device 30). The controllers 22, 26 (via the processors 36) are even further configured to instruct initiation (via a control signal) of the special effect in the interactive area in response to detecting the idiosyncratic task performed by the user. The controllers 22, 26 (via the processors) are yet further configured to update or retrain the personalized machine learning models for a specific user after each data point (interaction with the interactive area) is collected or after a set number of data points are collected. The data points can be for different tasks or the same tasks at the same or different interactive areas.

In certain embodiments, the controllers 22, 26 (via the processors 36) are configured, after a specific user has successfully completed (i.e., activated the special effect) a set number of interactive areas, to enable the user to create their own task or activity at the next interactive area to activate or initiate the special effect for the next interactive area. For example, if the user has completed ten interactive areas (taking into account their idiosyncrasies), the user can generate their own task or activity to activate the special effect at the eleventh interactive area.

Figure 5:
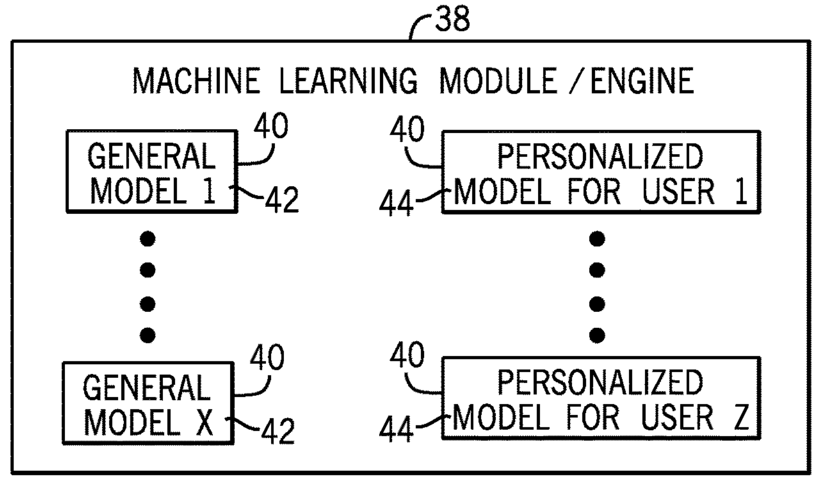
FIG. 5 is a machine learning module for facilitating user interaction with interactive areas, in accordance with aspects of the present disclosure.

FIG. 5 is a machine learning module or engine 38 for facilitating user interaction with interactive areas. The machine learning module 38 may be part of the system 20 described in FIG. 4. The machine learning module 38 may utilize machine learning capabilities in facilitating user interaction with interactive areas. In particular, the machine learning module 38 is configured to recognize the idiosyncrasies of a respective user. The machine learning module 38 may be utilized in detecting a task (e.g., an idiosyncratic task) performed by the user (with their personal idiosyncrasies) interacting with the interactive area to activate the special effect associated with the interactive area. Utilization of the machine learning module 38 helps the user interact with the interactive area by taking the user's idiosyncrasies into account when attempting to initiate or to activate the special effect so that what the user believes is the task or activity to activate the special effect is the actual take or activity to activate the special effect. For example, if a user consistently performs a gesture that follows a path curving to the right when being asked to perform a gesture following a straight vertical path, this idiosyncrasy may be accounted for by the machine learning module 38 and utilized to interpret gestures that should include a straight vertical path. In other embodiments, similar accommodations may be made for other gestures, gesture components, body movements (e.g., a hip shift when attempting to perform a particular arm gesture), voice modulations, and so forth. In this way, present embodiments can make personalized experiences that are more consistently successful and entertaining for individual users.

The machine learning module 38 may utilize one or more machine learning models 40. One or more of the machine learning models 40 are general machine learning models 42. The one or more general machine learning models 42 are configured to recognize tasks performed by users in general to activate respective special effects at different interactive areas. Each general machine learning model is configured to fit most data collected. Each general machine learning model is generated utilizing predetermined data collected from tasks performed by a number of different users at different interactive areas. In certain embodiments, a single general machine learning algorithm model 42 may be utilized that is configured for recognizing different categories of interactions or tasks (e.g., voice command, body motion, or movement of a manipulated device) performed by the user when interacting with an interactive area. In certain embodiments, different general machine learning models 42 may be utilized for recognizing a different category of interaction task. For example, a first general machine learning model may be utilized for voice command tasks, a second different general machine learning model may be utilized for body motion tasks, and/or a third different general machine learning model for tasks related to movement of the device. In certain embodiments, different general machine learning models 42 may be configured for different categories of general characteristics of people (e.g., based on height, age, or other characteristics relevant to performing the task or activity).

One or more of the machine learning models 40 are personalized machine learning models 44. The one or more personalized machine learning models 44 are configured to recognize idiosyncrasies of a specific user and to be utilized in detecting an idiosyncratic task performed by the specific user to activate a special effect associated with an interactive area. The personalized machine learning model 44 takes into account the idiosyncrasies of the user when they perform the task (e.g., idiosyncratic task) in a manner in which they believe the task should be performed. In certain embodiments, a user may have a single personalized machine learning model 44 to recognize different categories of idiosyncratic tasks (e.g., voice command, body motion, or movement of a manipulated device) performed by the user when interacting with interactive area. In certain embodiments, a user may have multiple personalized machine learning models 44 with a respective personalized machine learning model 44 for recognizing each different category of interaction or task (e.g., voice command, body motion, or movement of a manipulated device) performed by the user when interacting with an interactive area.

The personalized machine learning models 44 are generated by training the general machine learning model 42 using data points acquired from the same user. Each time the user performs an idiosyncratic task at an interactive area, the performance of the task serves as a data point for training, retraining, or updating the personalized machine learning model. The personalized machine learning model 44 may be updated after acquiring each data point or after a certain number of data points are acquired. In either case, the personalized machine learning model 44 is constantly being trained or updated. The data points may consist of the same and/or different idiosyncratic tasks performed at the same and/or different interactive areas. Besides being personal to the user, the trained machine learning model 44 is persistent in that it can be utilized for subsequent activities (e.g., the performance of different idiosyncratic tasks performed at different interactive areas).

Figures 6, 7:
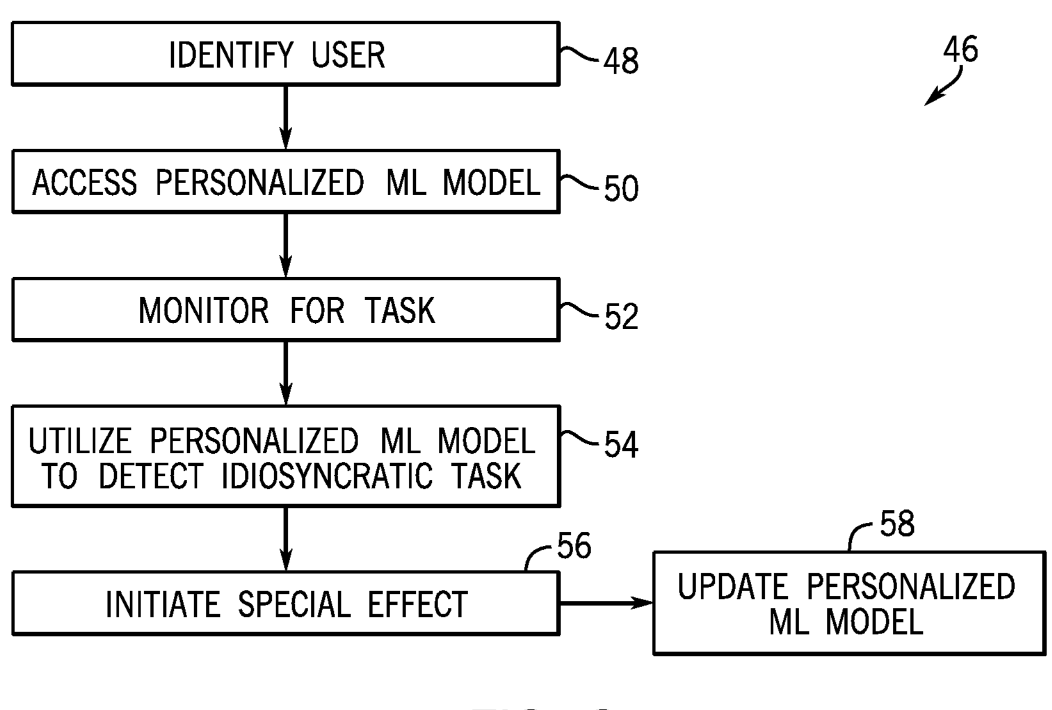
FIG. 6 is a flow chart of a method for facilitating user interaction with interactive areas, in accordance with aspects of the present disclosure.
FIG. 7 is a flow chart of a method for training a machine learning model for facilitating user interaction with interactive areas.

FIG. 6 is a flow chart of a method 46 for facilitating user interaction with interactive areas. The method 46 may be performed by the system 20 in FIG. 4 (e.g., one or more of the controllers 22, 26). One or more of the steps of the method 46 may be performed simultaneously and/or in a different order from that depicted in FIG. 6.

The method 46 includes identifying a user of an interactive area (e.g., based on identifying data obtained by the identification device 28 in FIG. 4) (block 48). The method 46 also includes obtaining or accessing a trained machine learning model personalized for the user, wherein the trained machine learning model is configured to recognize idiosyncrasies of the user (e.g., based on interactive data obtained by task detecting device 30 in FIG. 4) (block 50). The method 46 further includes monitoring for the task to be performed by the user at the interactive area to activate a special effect associated with the interactive area (block 52). The method 46 even further includes utilizing the trained machine learning model personalized for the user in detecting an idiosyncratic task performed by the user interacting with the interactive area to activate the special effect associated with the interactive area (e.g., based on interactive data obtained by task detecting device 30 in FIG. 4) (block 54). The method 46 still further includes initiating the special effect in response to detecting the idiosyncratic task (block 56). An example of an idiosyncratic task would be if a user consistently performs a gesture that follows a path curving to the right when being asked to perform a gesture following a straight vertical path. In other embodiments, similar accommodations may be made for other gestures, gesture components, body movements (e.g., a hip shift when attempting to perform a particular arm gesture), voice modulations, and so forth.

The method 46 yet further includes updating the trained machine learning model personalized for the user utilizing the idiosyncrasies of the user recognized when performing the idiosyncratic task (block 58). Each time the user performs an idiosyncratic task at an interactive area, the performance of the task serves as data point for retraining and/or updating the trained machine learning model personalized for the user. The trained machine learning model personalized for the user may be updated after acquiring each data point or after a certain number of data points are acquired. In either case, the trained machine learning model personalized for the user is constantly being trained and/or updated. The data points may consist of the same and/or different idiosyncratic tasks performed at the same and/or different interactive areas. The steps (blocks 48-58) of the method 46 may be repeated at the same or different interactive areas which may utilize the same or different idiosyncratic tasks.

FIG. 7 is a flow chart of a method 60 for training a machine learning model for facilitating user interaction with interactive areas. The method 60 may be performed by the system 20 in FIG. 4 (e.g., one or more of the controllers 22, 26). One or more of the steps of the method 60 may be performed simultaneously and/or in a different order from that depicted in FIG. 7.

The method 60 includes identifying a user of an interactive area (block 62). The method 60 also includes obtaining a general machine learning model, wherein the general machine learning model is configured to recognize tasks performed by users in general to activate respective special effects at different interactive areas (e.g., based on interactive data obtained by task detecting device 30 in FIG. 4) (block 64). The method 60 further includes monitoring for a task to be performed by the user at the interactive area to activate a special effect associated with the interactive area (block 66). In certain embodiments, the user at the interactive area or first interactive area utilizing a different type of task (e.g., voice versus body movement) from previous interactive areas may be asked to perform a series of tasks (e.g., similar to but not necessarily the same as the task to be performed at the present interactive area) to enable the acquisition of user specific data (e.g., calibration data) related to detecting user idiosyncrasies. The method 60 even further includes utilizing the general machine learning model in detecting the task performed by the user interacting with the interactive area to activate the special effect associated with the interactive area (e.g., based on interactive data obtained by task detecting device 30 in FIG. 4) (block 68). The method 60 still further includes initiating (via a control signal) the special effect in response to detecting the task (block 70).

The method 60 yet further includes training the general machine learning model based on one or more tasks performed by the user at one or more interactive areas to recognize the idiosyncrasies of the user to generate the trained machine learning model personalized for the user (block 72). In certain embodiments, user specific calibration data may also be utilized in training the general machine learning model to become the trained machine learning model personalized for the user. The general machine learning model may be trained after acquiring each data point or after a certain number of data points are acquired.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosed subject matter.

The invention claimed is:

1. A system for facilitating user interaction with interactive areas, the system comprising:

a memory encoding processor-executable routines; and a processor configured to access the memory and to execute the processor-executable routines, wherein the routines are configured to be executed by the processor to cause the processor to:

determine an identity of a user of an interactive area of an attraction at an amusement park or entertainment venue based on identifying data obtained at the interactive area;

obtain, from a plurality of different trained machine learning models and based on the identity of the user, a trained machine learning model personalized for the user;

utilize the trained machine learning model personalized for the user in detecting an idiosyncratic task performed by the user interacting with the interactive area to activate a special effect specific to the interactive area based on interactive data obtained at the interactive area, wherein activation of the special effect is triggered by attempted performance of a task specific to the interactive area, and wherein the trained machine learning model personalized for the user is configured to recognize idiosyncrasies of the user in the attempted performance of the task and to associate the idiosyncrasies with the task as the idiosyncratic task; and instruct initiation of the special effect at the interactive area in response to detecting the idiosyncratic task.

2. The system of claim 1, wherein the routines are configured to be executed by the processor to cause the processor to update the trained machine learning model personalized for the user utilizing the idiosyncrasies of the user recognized when performing the idiosyncratic task.

3. The system of claim 2, wherein the routines are configured to be executed by the processor to update the trained machine learning model personalized for the user after each performance of the idiosyncratic task or a different idiosyncratic task at a different interactive area.

4. The system of claim 2, wherein the routines are configured to be executed by the processor to update the trained machine learning model personalized for the user after a set number of performances of idiosyncratic tasks performed at any interactive area.

5. The system of claim 1, wherein the idiosyncratic task comprises a voice command, movement of the user, or movement of a device manipulated by the user.

6. The system of claim 1, wherein the routines are configured to be executed by the processor to cause the processor to:

identify the user at a different interactive area based on the identifying data obtained at the different interactive area;

utilize the trained machine learning model personalized for the user in detecting a different idiosyncratic task performed by the user interacting with the different interactive area to activate a particular special effect associated with the different interactive area based on additional interactive data obtained at the different interactive area; and instruct initiation of the particular special effect in response to detecting the different idiosyncratic task.

7. The system of claim 1, wherein the routines are configured to be executed by the processor to cause the processor to train a general machine learning model based on one or more idiosyncratic tasks performed by the user at one or more interactive areas to recognize the idiosyncrasies of the user to generate the trained machine learning model personalized for the user, wherein the general machine learning model is configured to recognize tasks performed by users in general to activate respective special effects at different interactive areas based on obtained interactive data.

8. A computer-implemented method for facilitating user interaction with interactive areas, the computer-implemented method comprising:

determining an identity of a user of an interactive area based on identifying data obtained at the interactive area of an attraction at an amusement park or entertainment venue;

obtaining, from a plurality of different trained machine learning models and based on the identity of the user, a trained machine learning model personalized for the user;

utilizing the trained machine learning model personalized for the user in detecting an idiosyncratic task performed by the user interacting with the interactive area to activate a special effect specific to the interactive area based on interactive data obtained at the interactive area, wherein activation of the special effect is triggered by attempted performance of a task specific to the interactive area, and wherein the trained machine learning model personalized for the user is configured to recognize idiosyncrasies of the user in attempting to perform the task and to associate the idiosyncrasies with the task as the idiosyncratic task; and initiating the special effect at the interactive area in response to detecting the idiosyncratic task.

9. The computer-implemented method of claim 8, further comprising updating the trained machine learning model personalized for the user utilizing the idiosyncrasies of the user recognized when performing the idiosyncratic task.

10. The computer-implemented method of claim 9, wherein the trained machine learning model personalized for the user is updated after each performance of the idiosyncratic task or a different idiosyncratic task at a different interactive area.

11. The computer-implemented method of claim 9, wherein the trained machine learning model personalized for the user is updated after a set number of performances of idiosyncratic tasks performed at any interactive area.

12. The computer-implemented method of claim 8, wherein the idiosyncratic task comprises a voice command, movement of the user, or movement of a device manipulated by the user.

13. The computer-implemented method of claim 8, wherein the trained machine learning model personalized for the user is configured to be utilized for performance of different types of idiosyncratic tasks by the user at different interactive areas.

14. The computer-implemented method of claim 8, further comprising obtaining a general machine learning model, wherein the general machine learning model is configured to recognize tasks performed by users in general to activate respective special effects at different interactive areas, and training the general machine learning model based on the interactive data obtained of one or more idiosyncratic tasks performed by the user at one or more interactive areas to recognize the idiosyncrasies of the user to generate the trained machine learning model personalized for the user.

15. A non-transitory computer-readable medium, the computer-readable medium comprising processor-executable code configured to be executed by a processor to cause the processor to:

determine an identity of a user of an interactive area of an attraction at an amusement park or entertainment venue based on identifying data obtained at the interactive area;

obtain, from a plurality of different trained machine learning models and based on the identity of the user, a trained machine learning model personalized for the user;

utilize the trained machine learning model personalized for the user in detecting an idiosyncratic task performed by the user interacting with the interactive area to activate a special effect specific to the interactive area based on interactive data obtained at the interactive area, wherein activation of the special effect is triggered by attempted performance of a task specific to the interactive area, and wherein the trained machine learning model personalized for the user is configured to recognize idiosyncrasies of the user in attempting to perform the task and to associate the idiosyncrasies with the task as the idiosyncratic task; and instruct initiation of the special effect at the interactive area in response to detecting the idiosyncratic task.

16. The non-transitory computer-readable medium of claim 15, wherein the code is configured to be executed by the processor to cause the processor to update the trained machine learning model personalized for the user utilizing the idiosyncrasies of the user recognized when performing the idiosyncratic task.

17. The non-transitory computer-readable medium of claim 16, wherein the code is configured to be executed by the processor to update the trained machine learning model personalized for the user after each performance of the idiosyncratic task or a different idiosyncratic task at a different interactive area, or after a set number of performances of idiosyncratic tasks performed at any interactive area.

18. The non-transitory computer-readable medium of claim 17, wherein the idiosyncratic task comprises a voice command, movement of the user, or movement of a device manipulated by the user.

19. The non-transitory computer-readable medium of claim 15, wherein the trained machine learning model personalized for the user is configured to be utilized for the performance of different idiosyncratic tasks by the user at different interactive areas.

20. The non-transitory computer-readable medium of claim 15, wherein the code is configured to be executed by the processor to cause the processor to train a general machine learning model based on one or more idiosyncratic tasks performed by the user at one or more interactive areas to recognize the idiosyncrasies of the user to generate the trained machine learning model personalized for the user, wherein the general machine learning model is configured to recognize tasks performed by users in general to activate respective special effects at different interactive areas.

* * * * *